D. B. DORSEY.
Fastenings for the End-Gates of Wagons.

No. 149,294. Patented April 7, 1874.

Witnesses.
R. Gebner
Dennis Timely

Inventor.
Dennis B. Dorsey.
By his attys.
Cox and Cox

UNITED STATES PATENT OFFICE.

DENNIS B. DORSEY, OF CHILLICOTHE, MISSOURI.

IMPROVEMENT IN FASTENINGS FOR THE END-GATES OF WAGONS.

Specification forming part of Letters Patent No. 149,294, dated April 7, 1874; application filed September 9, 1873.

*To all whom it may concern:*

Be it known that I, DENNIS B. DORSEY, of Chillicothe, Missouri, have invented certain new and useful Improvements in Wagon End-Gate Fasteners, of which the following is a specification, reference being had to the accompanying drawings.

The invention relates to a hinged end-gate rod having at one extremity a thread which engages a female thread at the center of a nut or disk fixed and rotating outside the wagon-bed and operable by a crank or lever. Between the inside of the wagon-bed and the cleat on the end-gate, the rod is jointed or hinged. Beyond this point it is provided with an angular or oval shoulder fitting into a corresponding aperture in the cleat. The rod passes through another cleat on the end-gate, thence through and beyond an angular or oval aperture in the opposite side of the wagon-bed, its extremity being provided with an angular or oval button, conforming to the last-named aperture. The object of the invention is to provide a convenient and effective means of securing the end-gates of wagons.

Figure 1:
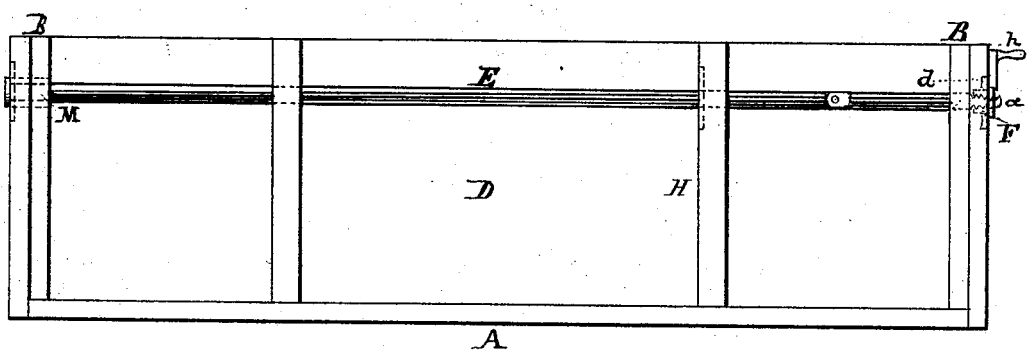
Figure 2:
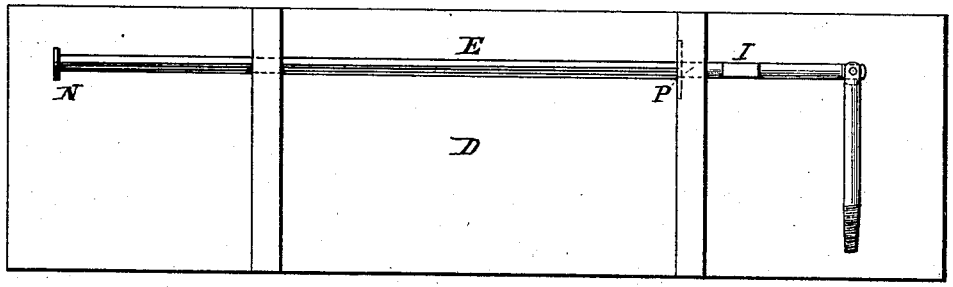

Figure 1 is a view of a device embodying my invention, showing the position of the parts when locked. Fig. 2 is the same when the parts are unlocked.

A, in the accompanying drawings, is the wagon-bed, adjacent the rear end of which are provided the guides B, between which the end-gate D is secured in a vertical position. The rod E is somewhat longer than the width of the wagon-bed A, and is provided at one end with a male screw, $a$, which passes through an aperture, $b$, in the wagon-bed, and is engaged outside thereof by the female screw at the center of the rotating disk or nut F, having a horizontal bearing, $d$, in the side of the wagon-bed, and operated by the crank or lever $h$. At a suitable distance between the inside of the wagon-bed and the cleat H, the rod E is hinged in any proper manner. Beyond this hinge it is provided at the point where, when in position, it passes through the cleat H, with an angular or oval shoulder, I, which fits into a corresponding aperture, P, in the cleat H. Thence the rod E extends through the cleat L, passing finally through an oval or angular aperture, M, in the other side of the wagon-bed, its extremity being provided with an oval or angular button, N, according to the contour of the aperture M.

The shoulder I should be angular or oval, or any other form, so that when in the aperture P the rod E cannot be rotated as the disk or nut F is revolved. The button N may be of any shape so that when turned it will not pass through the aperture M. The angular or oval shoulder I may be placed adjacent the button N, so as to engage the aperture M, if preferred.

Operation: The end-gate D being in position, rotate the disk F, by means of the crank or lever $h$, until the rod E is disengaged, move the rod toward the opposite side of the wagon-bed until clear of the aperture $a$, lower the hinged part and turn it until the sides of the button N and aperture M correspond, then draw the button through the aperture, when the end-gate may be removed. To replace the gate D, lower the hinged part, slide the gate to place between the guides B, push the button through the aperture M and turn it across the same, raise the hinged part, and push the male thread through the aperture $a$ until it engages the female thread in the disk or nut F, which being revolved, the rod E is drawn taut, the shoulder I preventing the rod from turning with the revolutions of the disk.

What I claim as my invention, and desire to secure by Letters Patent, is—

The hinged rod E, to be operated by the disk F, and having the button N, and shoulder I, in relation, respectively, to the apertures M and P, substantially as shown and described.

In testimony that I claim the foregoing improvements in wagon end-gate fasteners, as above described, I have hereunto set my hand and seal this 18th day of August, 1873.

DENNIS B. DORSEY. [L. S.]

Witnesses:
B. B. GILL, Jr.
E. J. BROADDUS.